United States Patent
Schunder

(10) Patent No.: US 9,558,015 B2
(45) Date of Patent: Jan. 31, 2017

(54) METHODS AND APPARATUS FOR ACTIVATING APPLICATIONS

(75) Inventor: Mark Schunder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1374 days.

(21) Appl. No.: 12/955,064

(22) Filed: Nov. 29, 2010

(65) Prior Publication Data

US 2012/0136503 A1 May 31, 2012

(51) Int. Cl.
*G06F 7/00* (2006.01)
*B60R 16/037* (2006.01)
*H04L 29/06* (2006.01)
*H04L 29/08* (2006.01)
*G06F 9/00* (2006.01)
*G06F 9/445* (2006.01)

(52) U.S. Cl.
CPC ............ *G06F 9/445* (2013.01); *B60R 16/037* (2013.01); *B60R 16/0373* (2013.01); *H04L 29/06* (2013.01); *H04L 29/08* (2013.01)

(58) Field of Classification Search
None
See application file for complete search history.

(56) References Cited

U.S. PATENT DOCUMENTS

| | | | |
|---|---|---|---|
| 6,366,202 B1 | 4/2002 | Rosenthal | |
| 6,573,833 B1 | 6/2003 | Rosenthal | |
| 7,047,117 B2 | 5/2006 | Akiyama et al. | |
| 8,121,802 B2 | 2/2012 | Grider et al. | |
| 8,131,458 B1 | 3/2012 | Zilka | |
| 2008/0086455 A1 | 4/2008 | Meisels et al. | |
| 2008/0305742 A1* | 12/2008 | Basir | 455/41.2 |
| 2009/0010448 A1 | 1/2009 | Voto et al. | |
| 2009/0075624 A1* | 3/2009 | Cox et al. | 455/345 |
| 2009/0140064 A1 | 6/2009 | Schultz et al. | |
| 2009/0156182 A1* | 6/2009 | Jenkins et al. | 455/414.2 |
| 2010/0037057 A1* | 2/2010 | Shim et al. | 713/171 |
| 2010/0157061 A1* | 6/2010 | Katsman et al. | 348/149 |

(Continued)

OTHER PUBLICATIONS

European Patent Office, Application No. 11151623, Dated Nov. 3, 2011.

(Continued)

*Primary Examiner* — Fadey Jabr
*Assistant Examiner* — Kevin P Mahne
(74) *Attorney, Agent, or Firm* — Jennifer Stec; Brooks Kushman P.C.

(57) ABSTRACT

A computer-implemented method of application control includes receiving a list of applications available on a wireless device in communication with a vehicle computing system (VCS). The method also includes storing a list of applications, including triggers associated with one or more of the applications, in a local memory. The method further includes monitoring, via the VCS, one or more vehicle sensors or other input mechanisms for a state which corresponds to a trigger. This method also includes comparing, via the VCS, the trigger to the triggers associated with one or more of the applications upon detection of a state which corresponds to a trigger. Finally, the method includes recommending at least one application having an associated trigger that is the same as the trigger to which the state corresponds for activation, via the VCS.

12 Claims, 3 Drawing Sheets

(56) References Cited

U.S. PATENT DOCUMENTS

| | | | |
|---|---|---|---|
| 2010/0216400 A1* | 8/2010 | Ushijima | 455/41.2 |
| 2010/0235744 A1* | 9/2010 | Schultz et al. | 715/717 |
| 2011/0087385 A1 | 4/2011 | Bowden et al. | |
| 2011/0110530 A1 | 5/2011 | Kimura | |
| 2011/0185390 A1* | 7/2011 | Faenger et al. | 725/75 |
| 2011/0275358 A1* | 11/2011 | Faenger | 455/420 |
| 2012/0064917 A1* | 3/2012 | Jenkins et al. | 455/456.1 |
| 2012/0065815 A1 | 3/2012 | Hess | |
| 2012/0084292 A1* | 4/2012 | Liang et al. | 707/741 |

OTHER PUBLICATIONS

International Search Report for the corresponding PCT/US2010/37052.

International Search Report, PCT/US2011/053342. Dated Sep. 27, 2011. Korean Intellectual Property Office.

PCT/US2011/053342 Advance E-mail PCT, Notification of Concerning transmittal of international preliminary report on patentability.

\* cited by examiner

METHODS AND APPARATUS FOR ACTIVATING APPLICATIONS

BACKGROUND

With the rise in popularity of IPHONES, ANDROID and other smartphones and PDAs, a vast marketplace of available applications has arisen. Millions of applications that run on these small, portable computer-like devices have been written, and the number of available applications continues to grow exponentially. The applications run the gamut from music players, to GPS functionality, to almost anything imaginable.

In June of 2009, the NEW YORK TIMES reported that it is estimated that an average smartphone user downloads 23.6 applications and uses 6.8 applications per day. Over half of smartphone users report using applications for over 30 minutes a day. (source http://bits.blogs.nytimes.com/2009/06/05/quantifying-the-mobile-apps-revolution/).

In many, if not all, instances, however, the applications have to be launched manually by the user. Many smartphones, such as the IPHONE 3G and earlier versions of the IPHONE, also will only run one application at a time. Further, keeping applications "on" can provide a drain on battery life. Accordingly, even if applications have functionality that could be situationally useful, smartphone users are not necessarily inclined to simply leave all the applications on their device running, in the event one is needed.

Additionally, cell phone usage while driving has been banned or limited in numerous jurisdictions. In some studies, it has even been shown that using a cellular phone or other wireless device to perform certain functions, such as texting, while driving, is actually more dangerous than drinking and driving. Accordingly, the focus of these laws is to keep the attention of the driver fixed on the road, as opposed to the wireless device.

Since drivers are more conscious of the perils of distracted driving, there are often opportunities that arise, while traveling, where an application might be useful, but the driver cannot or does not want to use the wireless device to activate the application, or look at a navigation screen installed as part of the vehicle package to start an on-board application. In other instances, a driver may not even know that a particular application would be useful in a particular setting.

SUMMARY

A first illustrative computer-implemented method of application control includes receiving a list of applications available on a wireless device in communication with a vehicle computing system (VCS). The exemplary method also includes storing a list of applications, including triggers associated with one or more of the applications, in a local memory. The method further includes monitoring, via the VCS, one or more vehicle sensors or other input mechanisms for a state which corresponds to a trigger.

This exemplary method also includes comparing, via the VCS, the trigger to the triggers associated with one or more of the applications upon detection of a state which corresponds to a trigger. Finally, the method includes recommending at least one application having an associated trigger that is the same as the trigger to which the state corresponds for activation, via the VCS.

A second illustrative embodiment includes a vehicle computing apparatus including receiving programmed logic circuitry to receive, at the vehicle computing apparatus (VCA), a list of applications available on a wireless device in communication with the VCA. The illustrative apparatus further includes storing programmed logic circuitry to store a list of applications, including triggers associated with one or more of the applications, in a local memory.

The illustrative embodiment further includes monitoring programmed logic circuitry to monitor, via the VCA, one or more vehicle sensors or other input mechanisms for a state which corresponds to a trigger.

The illustrative embodiment also includes comparing programmed logic circuitry to compare, via the VCA, the trigger to the triggers associated with one or more of the applications upon detection of a state which corresponds to a trigger.

Finally, the illustrative embodiment includes recommending programmed logic circuitry to recommend for activation, via the VCA, at least one application having an associated trigger that is the same as the trigger to which the state corresponds.

In a third illustrative embodiment, a computer readable storage medium stores instructions that, when executed by a vehicle computing system (VCS), cause the VCS to perform the method including receiving, at a VCS, a list of applications available on a wireless device in communication with the VCS, The computer is also caused to perform a step of storing a list of applications, including triggers associated with one or more of the applications, in a local memory.

In this embodiment, the computer is further caused to perform a step of monitoring, via the VCS, one or more vehicle sensors or other input mechanisms for a state which corresponds to a trigger. The computer is also caused to, upon detection of a state which corresponds to a trigger, perform a step of comparing, via the VCS, the trigger to the triggers associated with one or more of the applications Finally, the computer is caused to perform a step of recommending for activation, via the VCS, at least one application having an associated trigger that is the same as the trigger to which the state corresponds.

DETAILED DESCRIPTION

Although the following describes the invention in terms of illustrative embodiments, these examples are provided for non-limiting illustrative purposes only, and are not intended to limit the scope of the invention thereto.

Figure 1:
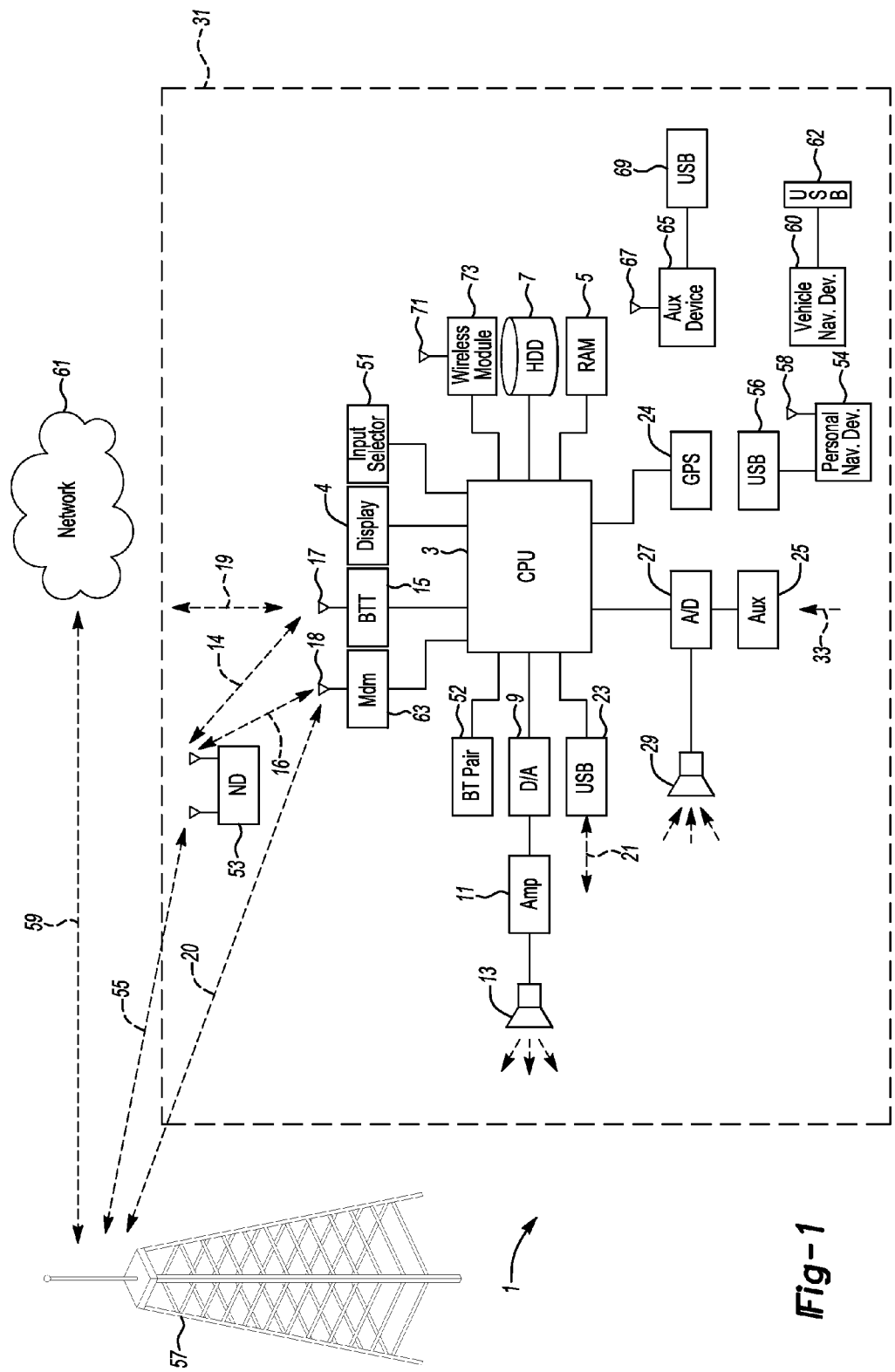
FIG. 1 shows an illustrative example of a vehicle computing system and a remote network.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data- plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

The illustrative embodiments provide a system for dynamic activation of applications based on environmental factors. Environmental factors can be determined by any number of vehicle systems or sensors, can be dynamically input by a driver, or can be detected or triggered by a third-party device connected to a vehicle computing system. Using a combination of all these (and other reasonable) detection methods, a vast array of information about the environment surrounding the driver can be known at any given time. Since many vehicle computing systems, such as, but not limited to, the FORD SYNC system, can also connect to the internet, gathered data can be cross-referenced with existing online data to determine even more about the environment surrounding the driver.

Environmental factors include, but are not limited to, weather, local businesses, a state of the driver's health, wellness, hunger, music, local venues, number of people in the vehicle, time of day, location, vehicle speed, occupant age, day of week, season (annual seasons or sports seasons), etc.

Some non-limiting examples of detection of each of the preceding non-exclusive examples, and possible application interaction, could include the following. Weather could be detected by vehicle sensors, or by a remote system combining a GPS location with local weather data. Once the weather was known or "guessed", an application, running on, for example, a vehicle computing system, could determine that the current weather was, for example, severe. This could cause a weather application, stored on a portable device in communication with the vehicle computing system, to launch and provide updated weather data to the driver via the vehicle computing system. In an instance such as this, the driver may want to know how long, for example, a storm will last, but may not be able to take focus off the road to get this information. Instead of scanning the radio for a weather report, the vehicle computing system automatically launches a weather application.

In at least one illustrative embodiment, some level of "intelligence" is pre-provided to the vehicle computing system and/or the applications. For example, a series of environmental based words could be pre-programmed into the vehicle computing system, along with a series of triggers for those words. In the preceding weather example, the words "severe weather, weather, storm, rain, snow, sleet" etc. could be associated with weather. Applications would then have certain triggers associated therewith as well, so the vehicle computing system would "know" that a particular application has bearing or applicability when a given trigger arises.

The trigger environment could even be left open, such that applications could add their own triggers and/or triggering routines to vehicle computing systems, when coming into communication with the computing system. In this embodiment, the combination of a trigger word associated with an environmental condition and the same trigger being associated with at least one application would cause the application to be launched or considered for launch when the trigger was "set" by an environmental condition. Similarly, this embodiment would include at least one routine that recognized certain environmental triggers and the words associated therewith. That is, the routine that detected the severe weather would also cause activation (or call a routine that caused activation) of one or more triggers, that could then be cross-referenced against the triggers associated with applications existing on a paired wireless device.

Another example of a local environmental factor would be a state of the driver. This could include wellness information fed into a vehicle computing system via a wireless or wired link. For example, without limitation, a blood-sugar monitor for a diabetic driver could provide feedback to a vehicle computing system. The driver may also have an application on a wireless device that finds the nearest convenience store when blood sugar is low.

In this example, low blood sugar warnings would cause the trigger "low blood sugar", "diabetic" or some other similar trigger, to occur. The vehicle computing system would then detect that at least one application on the wireless device also had the diabetic-related trigger associated therewith. The system might then launch that application, all without any actual instruction or interaction from the driver.

In another state-of-the-driver example, the driver could be hungry. Simply speaking the word "hungry" into a vehicle system input (such as, but not limited to, a microphone in a rear-view mirror) could cause the trigger of "hungry" "restaurant" "eat" etc. This could then cause the launch of, for example, a restaurant-related application.

It may be the case that many or all triggers could be activated by a driver simply by speaking the trigger. Thus, when a new application is downloaded, the driver could be provided with one or more trigger words related to that application. Speaking the words would activate the trigger, which in turn would cause the vehicle computing system to activate the application. Different trigger words could even activate different facets of the application.

In at least one example, however, instead of picking up a wireless device, activating an application, activating a voice-recognition program, then navigating the application using voice while driving, simply speaking the word to the vehicle computing system input causes the desired result. Thus the driver is left far less distracted.

In still another non-limiting example, the environment could include the song or program currently playing on the radio. For example, meta-data could be streamed to the radio, the data related to the song, an artist, the station, the album, etc. Any or all of this data could cause triggers to activate. This data could also simply be used if the driver verbally (or otherwise) activates a trigger.

For example, if a new song by an artist was playing on the radio, the driver could speak the trigger "purchase song" or "purchase album." This could cause one of several applications to launch. If there was sufficient data to simply purchase the album, the vehicle computing system could look for an application with an associated "purchase album" trigger. But, prior to or after launching the application, the vehicle computing system may discover that there is insufficient data. So it could look for an application with a "music information" trigger associated therewith. It could then launch this application and feed it the song name.

Launching of the music information application may result in information being provided back to the driver, which might then require some interactivity on the driver's part to purchase the album. For example, without limitation, the driver's first request to "purchase album" may have launched a first purchasing application, which then asked the driver, "which album do you wish to purchase" (assuming the data was not available). The driver may then have to trigger "song information" to launch a second application, which would then return the name of the album. The driver would then re-trigger purchase album and complete the transaction. Even though the driver was required, in this example, to interact somewhat with the vehicle computing system, the driver still never had to take primary focus off of the road, or do anything more than speak to the computer.

The above example, and many others, could also be facilitated as greater interactivity between applications is enabled. For example, it may be desirable and lucrative enough, especially with respect to music purchasing, to integrate several applications and/or make the vehicle computing system capable of performing some or all of the above "driver steps" without interaction. If a large enough standardized communication library of errors, APIs, etc was used, the vehicle computing system could recognize that an album meta-data was not present (following a "purchase album" trigger), launch a query app (if available), obtain the required data, and feed it back to the purchase album application.

Another illustrative example of multiple application use could be with respect to a venue and an event at the venue. For example, a vehicle computing system could detect that a user was within proximity of a particular venue (based on GPS coordinates, at least in part). This could cause launching of an event notification application. Once the user was notified of the event, a trigger of "purchase tickets" could cause a second, purchasing application to be launched. All the relevant data from the first application could be pre-populated to the second application by the vehicle computing system, so that the user only need select, for example, seats. Event name, date, etc. could already be input. In one example, the actual activation of one application could be a trigger for a second application.

Since it is possible that some users would find this automatic launching of applications distracting in and of itself, it may also be possible to limit, via pre-sets, what types of triggers are allowed. For example, a basketball fan may want to know whenever there is a home game at the area he drives by every day, but may not need food reminders at dinner time as well. One solution would be not to have an application for the latter situation, but as an alternative, the basketball fan could preset triggers for "venue" or "sports event" or "basketball" etc. Then, in this illustrative example, only these triggers would cause an attempt to automatically launch an application.

By integrating applications, standardizing triggers and allowing a custom tailored experience, it is possible to have the applications on a wireless device seamlessly opened and closed as is situationally and desirably appropriate, with little or no distraction from driving. Thus, drivers can access their applications, when needed, without having to take their attention from the road.

The following provides some non-limiting examples of illustrative routines that are one avenue of obtaining some of the functionality described herein.

Figure 2:
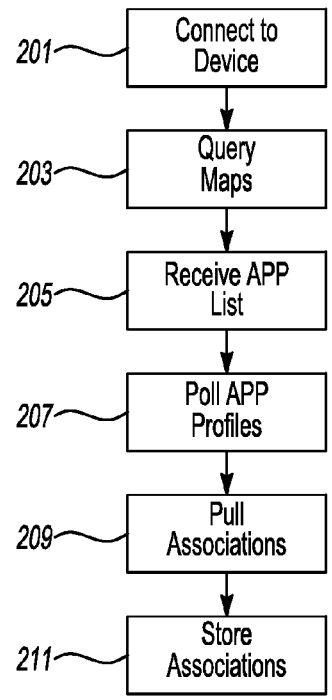
FIG. 2 is an illustrative embodiment of assembly of a list of triggers associated with applications accessible on a wireless device in communication with a vehicle computing system.

FIG. 2 is an illustrative embodiment of assembly of a list of triggers associated with applications accessible on a wireless device in communication with a vehicle computing system.

In this illustrative embodiment, a vehicle computing system connects to a paired device 201. The connection is wire or wireless, and it allows communication between the wireless device and the vehicle computing system.

The vehicle computing system then queries the applications stored on the wireless device 203. Any acceptable technique is reasonable for this query. For example, without limitation, it may be possible to populate a list, transferrable over at least a wireless connection, of applications on the wireless device and any associated attributes (such as, in this example, associated trigger words).

The list of applications is received at the vehicle computing system 205. In this embodiment, the triggers were associated with the applications by the application developers, in accordance with available triggers made known by the vehicle manufacturer. Once the list is received at the vehicle the applications on the list are polled by the vehicle computing system 207 and the triggers associated with the particular applications are pulled from the list 209 and stored locally 211.

Figure 3:
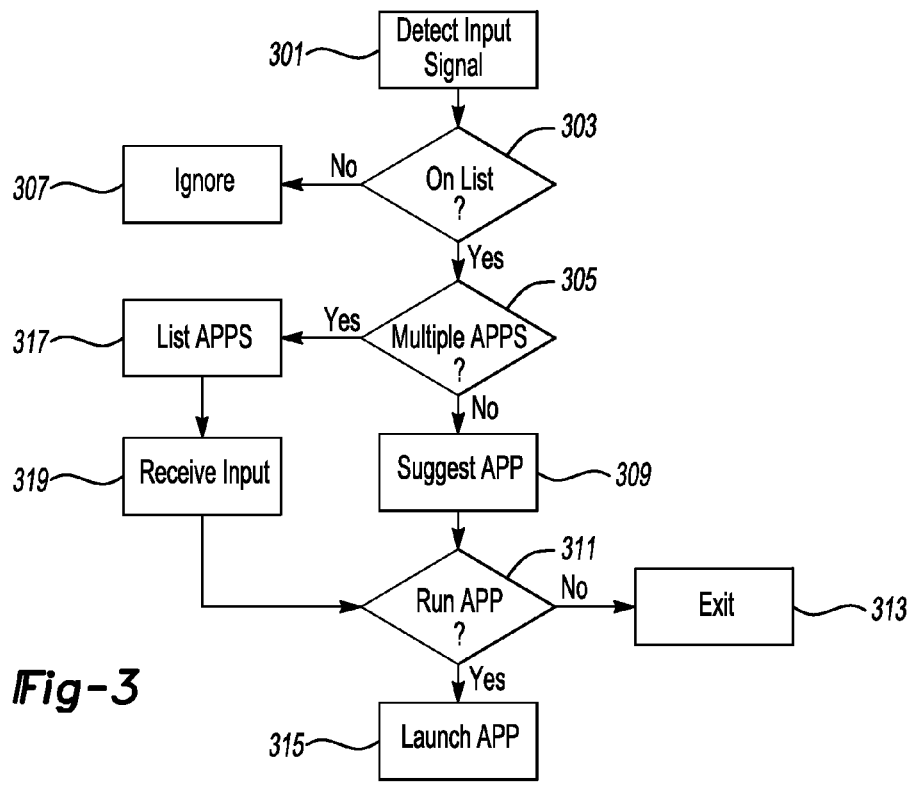
FIG. 3 shows an illustrative embodiment of a general process for dynamic application activation based on one or more environmental triggers.

FIG. 3 shows an illustrative embodiment of a general process for dynamic application activation based on one or more environmental triggers. In this illustrative embodiment, the vehicle computing system first detects an input signal 301. This signal could be driver input (spoken, button originated, etc) or could be generated by the incidence of one or more environmental factors. For example, if a user has pre-selected that all music of a certain type is to elicit a certain reaction, then an incidence of a particular song may result in the automatic origination of a trigger for input. Alternatively (or additionally), a user can verbally instruct any given trigger.

Once the trigger has been received or generated, the system checks to see if the trigger exists on a pre-populated list 303. For example, if the trigger "purchase music" is detected, the system will check the pre-populated list (derived from all triggers associated with applications currently available on a connected wireless device) to see if an application with the ability to purchase music (as indicated by an associated trigger) exists.

If no application with a corresponding trigger exists, then the system will (in this embodiment) ignore the trigger 307. Since the vehicle, in this embodiment, will be running one or more routines corresponding to the trigger generation logic, it is quite possible to have triggers generated in situations where a corresponding application is not available. In one example, a complex and robust logical algorithm produces a variety of triggers in a variety of situations. These triggers are then made available to application developers so that they may be integrated with and/or associated with particular applications.

In a different example, a more basic set of logical routines is provided, and particular applications can load new triggers and associated events that are to originate instances of those triggers (this approach can also be taken with the previously described more robust system).

If there is at least on instance of the trigger on the pre-populated list, the system checks to see if there are multiple applications having the trigger associated therewith 305. Although triggers are described with respect to the illustrative embodiment as words, there is also the possibility that triggers are codes, numbers, letters, or any suitable designator of an action to be taken.

If there are multiple applications having triggers associated therewith, the system lists the corresponding applications 317 (visually, audibly, etc). In this embodiment, the system then waits for a selection of an available application 319. If there is only one application corresponding to the trigger, the system recommends the application for the situation which has arisen 309.

In at least one embodiment, the system may be pre-set to run some or all applications in a given situation. For example, a user may not want to automatically purchase particular music types, but would rather be given the option when such a type occurs on the radio. On the other hand, a user may always want a weather report whenever a vehicle sensor detects the presence of precipitation, and thus a weather application may be launched without asking the user each time.

Once the application has been suggested, in this illustrative example, the system waits to see if the user desires the application to run 311. If the user does not, the process exits 313 (exiting may also result in some sort of delay setting within the system, so that a recurring trigger does not activate the process again immediately upon exit).

If the user desires the launching of the application, then the system processes a "run" command and sends this command to the wireless device, to cause an instantiation of the desired application 315. Again, it may be the case that an internal delay is set with respect to the trigger to prevent the same event from causing multiple triggers.

Figure 4:
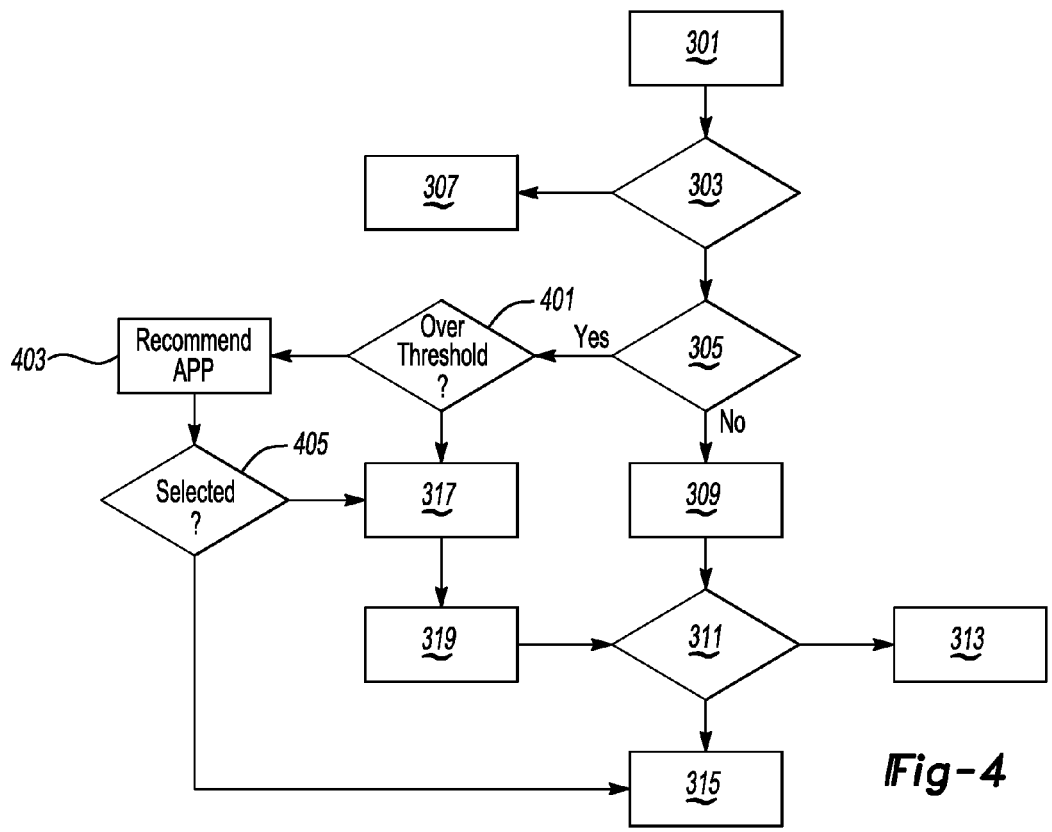
FIG. 4 shows an illustrative embodiment of a process for a preferred application selection process.

FIG. 4 shows an illustrative embodiment of a process for a preferred application selection process. In this illustrative embodiment, the trigger detection and generation process is generally the same as that shown with respect to FIG. 3. In this case, however, the system is capable of recognizing that a particular application is preferred for a given trigger or situation.

The illustrative process proceeds in the previously described fashion, unless it is discovered that a trigger (or triggers) corresponds to more than one application stored on the pre-populated list 305. Although this list has been heretofore described as a pre-populated list, the list could also be dynamically populated upon the incidence of a trigger, for example, or the triggers could simply be dynamically checked against existing applications upon each incidence thereof.

In the illustrative embodiment shown with respect to FIG. 4, when multiple applications corresponding to a trigger are present, the system checks to see if usage of a particular application is over a threshold 401. When an application is selected, for example, the system may make a note or a log of this selection for future reference.

If no application is over the threshold, the system treats all applications as equals and processes them accordingly 317. But, if a particular application has been selected with respect to a trigger frequently enough, the system may recommend the application as a preferred application 403. If the user agrees with this selection (or has the system set to automatically accept recommendations) 405, then the system processes the recommended application 315. Otherwise, the system treats the incidence of the trigger as if no preferred application had existed 317.

Figure 5:
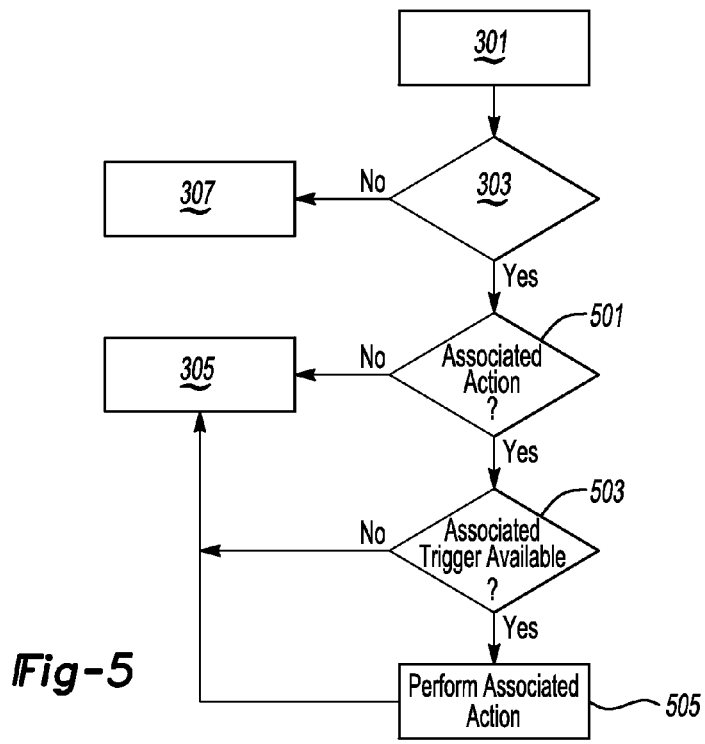
FIG. 5 shows an illustrative embodiment of a process for launching an integration routine integrating two or more logically connected triggers based on the presence of at least a first trigger.

FIG. 5 shows an illustrative embodiment of a process for launching an integration routine integrating two or more logically connected triggers based on the presence of at least a first trigger.

In this illustrative embodiment, certain triggers may cause instances of a second trigger, if such a trigger is available and will aid in the completion of a given task. Once a certain trigger is detected, the system checks to see if there is a secondary action associated with that particular trigger 501.

For example, without limitation, if a user/trigger requests purchase of an album corresponding to a song playing on the radio, there may not be album information provided in correspondence with the song. In a case such as this, the system may check to see if there is an associated action 501, such as "lookup album". Thus, a "purchase album" trigger may cause an instance of a "lookup album" trigger if album data is not available. If there is no associated action, or if there is an associated action, but the action cannot be processed 503 (due, for example, to a lack of an application corresponding to the "lookup album" trigger), then the system may just process the original application trigger 305. Otherwise, the system first performs the associated action(s) 5050 and then processes the original trigger.

Although this invention has been described in terms of illustrative embodiments, these are meant as examples only and are not intended to limit the scope of the invention. Reasonable and well known substitutions for portions of processes described herein are contemplated to be within the scope of the invention.

What is claimed:

1. A vehicle computing apparatus comprising:
    A transceiver to receive, at the vehicle computing apparatus (VCA), a list of applications available on a wireless device in communication with the VCA;
    vehicle-based storage to store a list of applications, including application-activating triggers associated with one or more of the applications, in a local memory;
    at least one monitoring routine, to monitor, via the VCA, one or more vehicle sensors or other input mechanisms for a state which corresponds to a trigger;
    at least one comparing routine to compare, upon detection of a state which corresponds to a trigger, the trigger to the triggers associated with one or more of the applications; and
    at least one activation routine to recommend activation of at least one application having an associated trigger that is the same as the trigger to which the state corresponds.

2. The apparatus of claim 1, wherein the receiving is in response to a query sent from the VCA.

3. The apparatus of claim 1, further comprising at least one automatic activation routine to automatically activate an application if the application is the only application having a trigger associated therewith that also is the same as the trigger to which the state corresponds.

4. The apparatus of claim 1, further comprising at least one automatic activation routine to automatically activate an application if the application has a trigger associated therewith that is the same as the trigger to which the state corresponds and the application is designated as a priority application.

5. The apparatus of claim 4, wherein the automatically activating an application further comprises automatically activating the application if the application is designated as a priority application with respect to the trigger associated therewith that is the same as the trigger to which the state corresponds.

6. The method of claim 1, further comprising at least one automatic activation routine to automatically activate an application if the application has been selected for activation by a vehicle occupant at least a predetermined number of previous times in response to the trigger corresponding to the detected state.

7. A computer readable storage medium storing instructions that, when executed by a vehicle computing system (VCS), cause the VCS to perform the method comprising:
    receiving, at a VCS, a list of applications available on a wireless device in communication with the VCS;
    storing a list of applications, including triggers associated with one or more of the applications, in a local memory;
    monitoring, via the VCS, one or more vehicle sensors or other input mechanisms for a state which corresponds to a trigger;
    upon detection of a state which corresponds to a trigger, comparing, via the VCS, the trigger to the triggers associated with one or more of the applications; and
    recommending for activation, via the VCS, at least one application having an associated trigger that is the same as the trigger to which the state corresponds.

8. The computer readable storage medium of claim 7, wherein the receiving is in response to a query sent from the VCS.

9. The computer readable storage medium of claim 7, wherein the recommending further comprises automatically activating an application if the application is the only application having a trigger associated therewith that also is the same as the trigger to which the state corresponds.

10. The computer readable storage medium of claim 7, wherein the recommending further comprises automatically activating an application if the application has a trigger associated therewith that is the same as the trigger to which the state corresponds and the application is designated as a priority application.

11. The computer readable storage medium of claim 10, wherein the automatically activating an application further comprises automatically activating the application if the application is designated as a priority application with respect to the trigger associated therewith that is the same as the trigger to which the state corresponds.

12. The computer readable storage medium of claim 7, wherein the recommending further comprises automatically activating an application if the application has been selected for activation by a vehicle occupant at least a predetermined number of previous times in response to the trigger corresponding to the detected state.

\* \* \* \* \*